US010496416B2

(12) United States Patent
Aseev et al.

(10) Patent No.: US 10,496,416 B2
(45) Date of Patent: Dec. 3, 2019

(54) SYSTEM AND METHOD FOR AUTOMATIC SOFTWARE INSTALLATION AND CONFIGURATION

(71) Applicant: Acronis International GmbH, Schaffhausen (CH)

(72) Inventors: Evgeny A. Aseev, Moscow (RU); Stanislav S. Protasov, Moscow (RU); Tian Huat Tan, Singapore (SG); Serguei M. Beloussov, Costa del Sol (SG)

(73) Assignee: Acronis International GmbH, Schaffhausen (CH)

( * ) Notice: Subject to any disclaimer, the term of this patent is extended or adjusted under 35 U.S.C. 154(b) by 88 days.

(21) Appl. No.: 15/895,034

(22) Filed: Feb. 13, 2018

(65) Prior Publication Data
US 2018/0232245 A1 Aug. 16, 2018

Related U.S. Application Data

(60) Provisional application No. 62/459,219, filed on Feb. 15, 2017.

(51) Int. Cl.
G06F 9/00 (2006.01)
G06F 9/24 (2006.01)
G06F 15/177 (2006.01)
G06F 9/445 (2018.01)
G06F 8/61 (2018.01)

(52) U.S. Cl.
CPC ............ G06F 9/44505 (2013.01); G06F 8/61 (2013.01)

(58) Field of Classification Search
CPC .................................................. G06F 9/44505
See application file for complete search history.

(56) References Cited

U.S. PATENT DOCUMENTS

| 2007/0156706 | A1* | 7/2007 | Hayes | G06F 11/326 |
| 2008/0027785 | A1* | 1/2008 | Mechaley, Jr. | G06Q 30/0201 705/7.29 |
| 2014/0324192 | A1* | 10/2014 | Baskaran | G05B 15/02 700/19 |
| 2015/0039806 | A1* | 2/2015 | Green | G06F 3/0614 711/103 |
| 2016/0066120 | A1* | 3/2016 | Lee | H04L 67/22 455/405 |
| 2017/0139738 | A1* | 5/2017 | Kim | G06F 9/45558 |

* cited by examiner

Primary Examiner — Mohammed H Rehman
(74) Attorney, Agent, or Firm — Arent Fox LLP; Michael Fainberg

(57) ABSTRACT

A system and method that automatically configures and adjusts computer systems and computer software (i.e., computer programs), on the basis of data collection and analysis to create usage patterns. An exemplary method includes collecting device information of existing computing devices and user information associated with operation of the existing computing devices. Moreover, the method include analyzing the device information and the user information to generate usage patterns associated with the existing devices. The method then compares device and user information of the computing device with the usage patterns associated with the existing devices to identify an optimal configuration for the computing device. The optimal configuration is used to generate installation instructions and configurations. Finally, the system settings of the computing device are automatically configured based on the instructions and configurations.

23 Claims, 6 Drawing Sheets

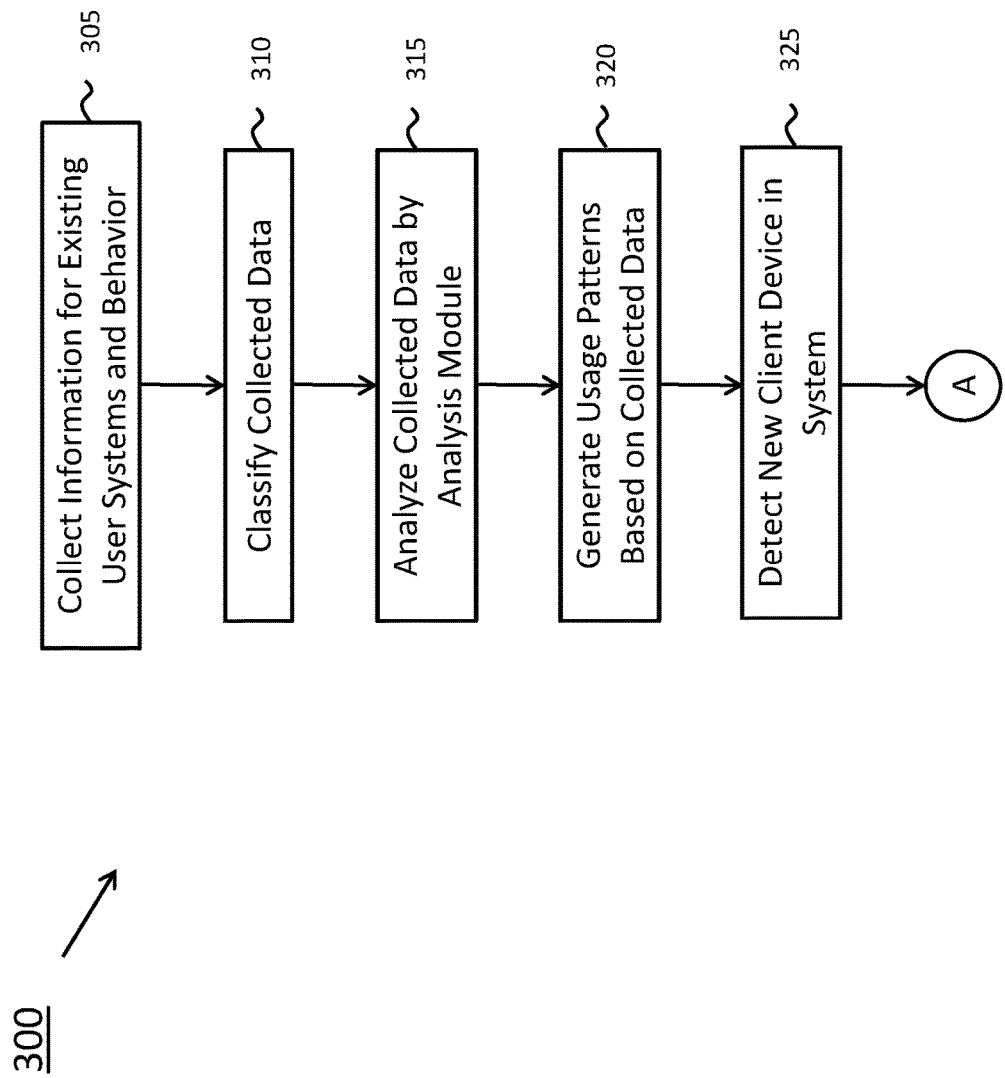

SYSTEM AND METHOD FOR AUTOMATIC SOFTWARE INSTALLATION AND CONFIGURATION

CROSS-REFERENCE TO RELATED APPLICATIONS

This application claims priority to U.S. Provisional Patent Application No. 62/459,219 which was filed on Feb. 15, 2017, the contents of which is incorporated herein by reference in its entirety.

TECHNICAL FIELD

The present disclosure generally relates to software installation on a client device, and, more particularly, to a system and method for optimizing software installations, configurations and operational settings.

BACKGROUND

With the continuing development and processing abilities of devices, such as personal computers, laptops, smartphones, and the like, users of these devices will often have dozens or even hundreds of software applications installed on each device. Moreover, the installation and configuration of the software applications and system settings typically takes a long time, especially for unsophisticated users. For example, many users of software applications will often not understand the intricacies of modern software settings for these advanced computing devices, and, as a result, will often choose improper or non-optimal installations, configurations and operational settings.

Traditionally, software application installation and configuration operations are performed manually, for example by editing the configuration file (as was done in DOS, and often still done in Linux OS). More recently, software companies have provided other ways to configure software applications during the installation by, for example, using "Wizards" (i.e., assistants) that ask the user to answer a series of questions to choose the installation and setting options, depending on user preferences. However, in both cases, most users often do not have the necessary experience and knowledge to enable them to select the proper options to configure a complex modern software applications for optimal functionality.

Accordingly, there is a need for a system and method that optimizes software installation and configuration setting that meets a device user's specific needs and desired settings and functionality.

SUMMARY

Accordingly, a system and method is provided for automatically configuring and adjusting computer systems and computer software (i.e., computer programs), on the basis of data collection and analyzing to create usage patterns. In one exemplary aspect, a method is provided for automatic configuration of a computing device. In this aspect, the method includes collecting, in an electronic database, device information of a plurality of computing devices and user information associated with operation of the plurality of computing devices; analyzing, by a computer processor, the device information and the user information to generate at least one usage pattern associated with the plurality of computing devices; comparing, by the computer processor, system information of the computing device with the at least one usage pattern associated with the plurality of computing devices to identify an optimal configuration for the computing device; and automatically configuring, by the computer processor, the system settings of the computing device based on the identified optimal configuration.

According to another exemplary aspect, the method includes generating, by the computer processor, a plurality of usage patterns associated with the plurality of computing devices based on the analyzing of the device information and the user information; and identifying, by the computer processor, the optimal configuration for the computing device based on a closest match between one of the plurality of usage patterns and the system information of the computing device.

According to another exemplary aspect, the system information of the computing device includes software, geographical location, and communication channels used by the computing device and the device information of the plurality of computing devices comprises information relating to software and hardware environments, bandwidth of communication channels, and geographic location of the plurality of computing device.

According to another exemplary aspect, the user information of the plurality of computing devices comprises and user preferences selected for the plurality of computing devices.

According to another exemplary aspect, the method includes adding the system information of the computing device to the device information of the plurality of computing devices collected in the electronic database to build a profile for generating the at least one usage pattern.

According to another exemplary aspect, the automatic configuring of the system settings of the computing device comprises transmitting instructions to the computing device to set the system setting accordingly.

According to another exemplary aspect, a system is provided for automatic configuration of a computing device. In this aspect, the system includes an electronic database configured to store device information of a plurality of computing devices and user information associated with operation of the plurality of computing devices; and a computer processor configured to analyze the device information and the user information to generate at least one usage pattern associated with the plurality of computing devices, compare system information of the computing device with the at least one usage pattern associated with the plurality of computing devices to identify an optimal configuration for the computing device, and automatically configure the system settings of the computing device based on the identified optimal configuration.

The above simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the disclosure and, together with the detailed description, serve to explain their principles and implementations.

FIG. 3A and FIG. 3B illustrate a flowchart for a method for optimizing software installations, configurations and operational settings based on predetermined usage patterns according to an exemplary aspect.

DETAILED DESCRIPTION

Figure 1:
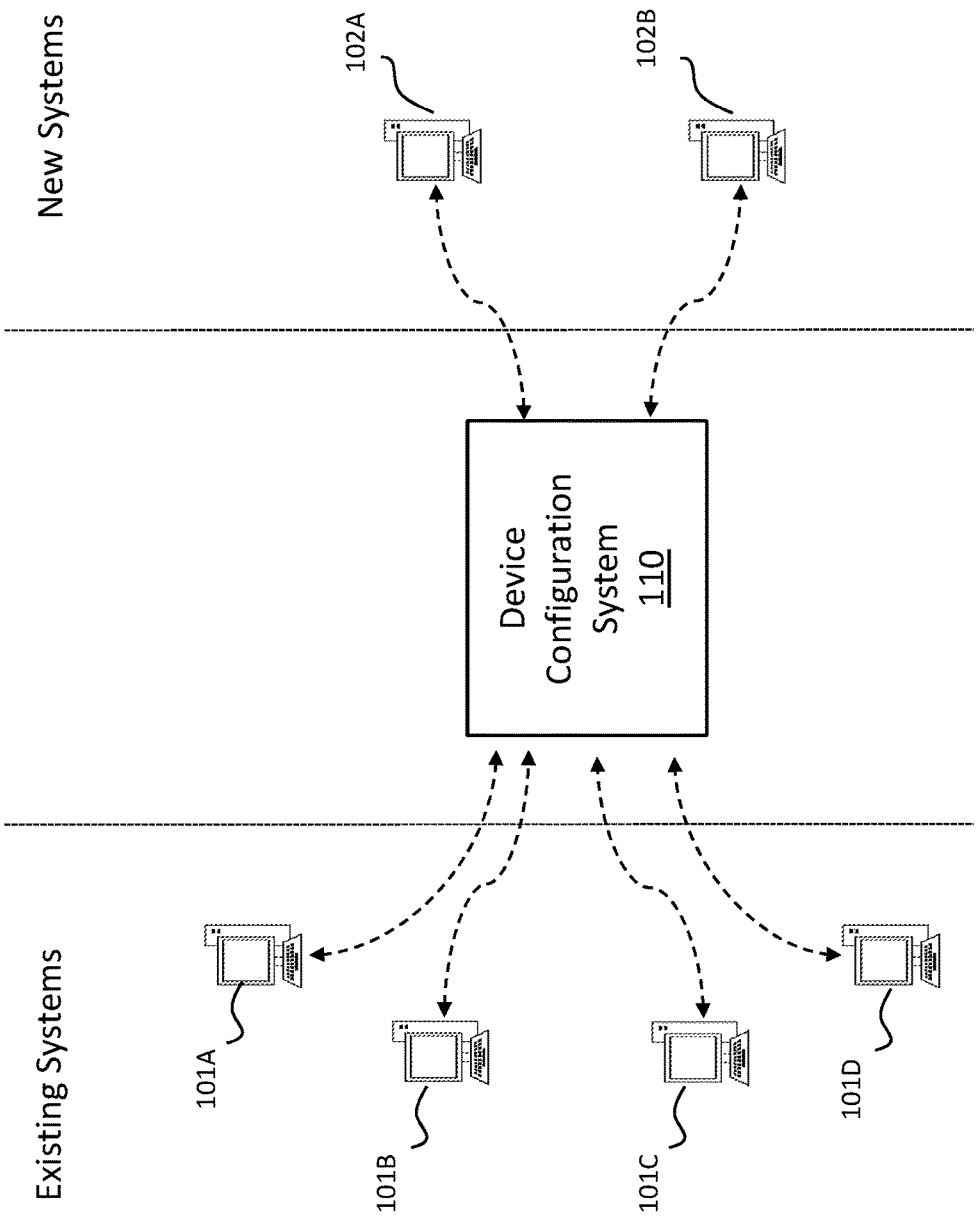
FIG. 1 illustrates a block diagram of a system for optimizing software installations, configurations and operational settings based on predetermined usage patterns according to an exemplary aspect.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

FIG. 1 illustrates a block diagram of a system 100 for optimizing software installations, configurations and operational settings based on identified device and software usage patterns and device and software characteristics, and user patterns, collectively referred to as "usage patterns", according to an exemplary aspect. As shown, the system 100 includes a plurality of existing computing systems 101A, 101B, 101C and 101D. For example, the computing systems can be devices of an individual user, such as a personal computer, laptop, smartphone, tablet, etc. Alternatively, the computing systems can be personal computers as part of a corporate network, for example. Each of the existing computing systems 101A-101D can be a conventional computing device that includes hardware and software components, as will be appreciated to one skilled in the art. Moreover a plurality of software applications can be installed and configured thereon as will be discussed in more detail below. It should be appreciated that while four existing computing systems 101A-101D are shown in FIG. 1, the disclosed system can be implemented using any number of computing devices that can be included in the network, for example.

Furthermore, each of the existing computing systems 101A-101D can be considered client devices, communicatively coupled to a device configuration system 110 over a network (e.g., a corporate network). For example, the network can be any network for communicating data and data operations and can include a communication system (not shown) that connects the various components of the system 100 by wire, cable, fiber optic, and/or wireless links facilitated by various types of well-known network elements, such as hubs, switches, routers, and the like. It should be appreciated that the network may employ various well-known protocols to communicate information amongst the network resources. In one aspect, the network can be part of the Internet or intranet using various communications infrastructure such as Ethernet, WiFi and the like.

The details of the device configuration system 110 will be discussed in detail below. However, the device configuration system 110 can be a computing device (e.g., a personal computer or server) that is configured to collect and analyze installation and operational settings from the plurality of existing computing systems 101A-101D. Moreover, this information can be analyzed to identify usage patterns, which can, in turn, be used to install and configure software applications and system settings on new computing systems 102A and/or 102B added to the system 100 and/or network. For example, new systems 102A and 102B can be similar computing devices (as discussed above) that communicatively connect (by the network, for example) to device configuration system 110 and request or are scheduled to receive a software application for installation thereon. Based on the usage patterns generated according to the data collected from existing computing systems 101A-101D, the device configuration system 110 can generate installation and configuration instructions for the software application to be installed the new computing systems 102A and 102B.

It should be appreciated that two new computing systems 102A and 102B are shown as an example and that one or a plurality of new computing systems can be added for installation and/or system configuration at a given time. Moreover, while computing systems 102A and 102B are described as "new" according to the exemplary aspect, it should be appreciated that computing devices 101A-101D and 102A-102B can all be part of an existing network or collection of computing devices (e.g., a corporate network). In one example, a first set of computing devices (e.g., computing devices 101A-101D) may have currently installed software applications from which the device configuration system 110 is capable of collecting relevant device and user data. Then, when a second set of computing devices (e.g., computing devices 102A-102B) is added to the system and/or requests or is scheduled to receive the software application, the device configuration system can use the generated usage patterns to install this software application. It should be appreciated that alternative arrangements can be implemented within the scope of the disclosed system and method as would be understood to one skilled in the art.

Figure 2:
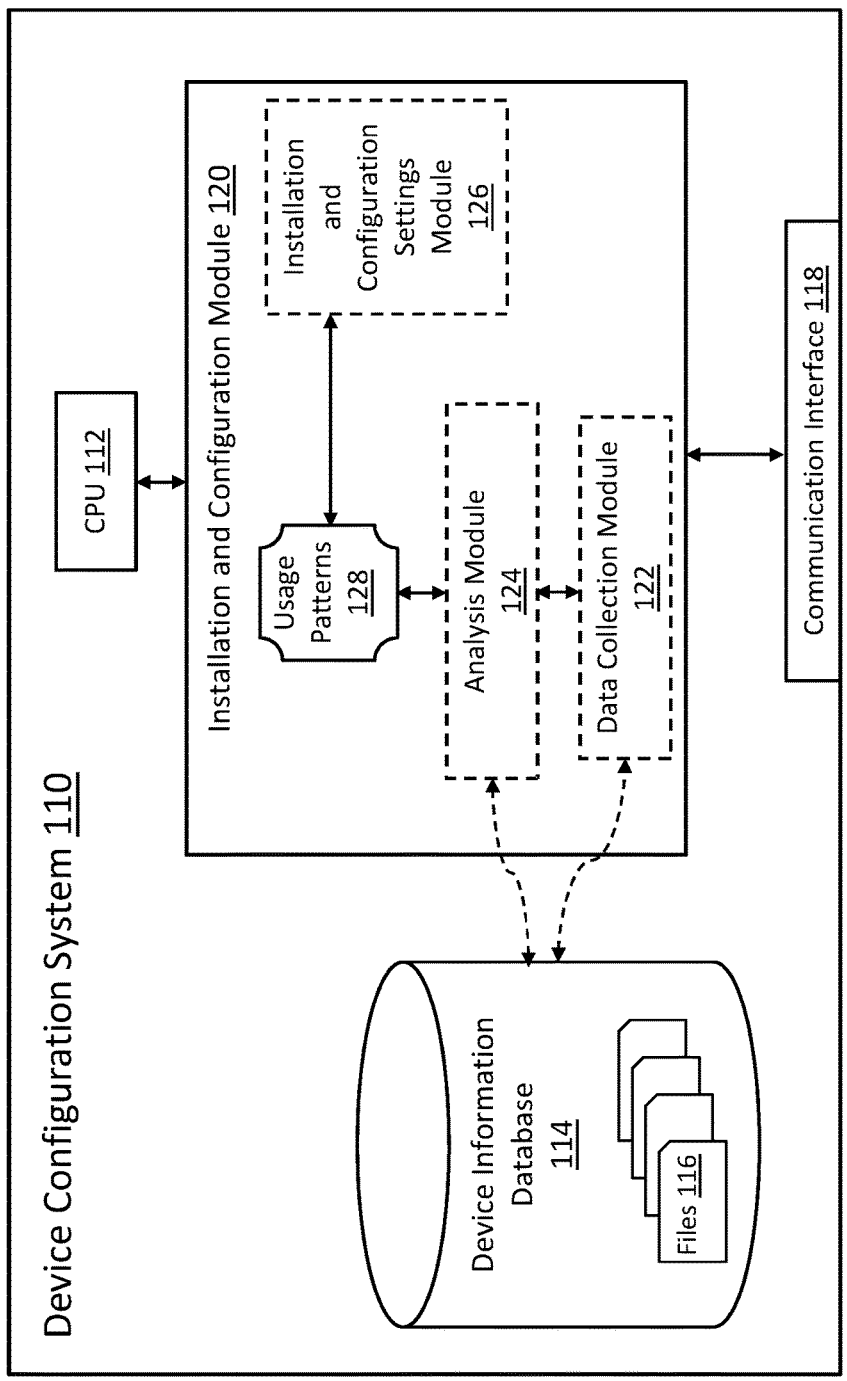
FIG. 2 illustrates a block diagram illustrating a device configuration system for optimizing software installations, configurations and operational settings based on predetermined usage patterns according to an exemplary aspect.

FIG. 2 illustrates a block diagram illustrating a device configuration system 110 for optimizing software installations, configurations and operational settings based on predetermined usage patterns according to an exemplary aspect. As shown, the device configuration system 110 includes a computer processing unit ("CPU") 112 and an installation and configuration module 120. Moreover, the device configuration system 110 also includes electronic memory (not shown in FIG. 2) that stores executable code that is executed by the CPU 112 to execute one or a plurality of modules configured to perform the algorithms disclosed herein, including the installation and configuration module 120.

The installation and configuration module 120 can include a plurality of sub-modules, including data collection module 122, analysis module 124 and installation and configuration settings module 126. It should be appreciated that each of the modules can be executed as a sub-module of installation and configuration module 120, as separate modules altogether, or one single module. Moreover, as used herein, the term "module" can refer to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

An example of the hardware components of the device configuration system 110 is described below with respect to FIG. 4. However, in general, the device configuration system 110 can include a communicative interface 118 that facilitates data communication with existing computing devices 101A-101D and new computing devices 102A-102B by a network as described above. Moreover, the device configuration system 110 includes a device information database 114 that is configured to store device data collected from the plurality of existing computing devices 101A-101D in a structured form, for example, as files 116. More particularly, the files 116 can include electronic data about users (user information) and their respective computing devices 101A-101D (device information), including both factual information (e.g., type of equipment, communication channels, installed software) as well as heuristic information, including information about the habits and preferences of users of the devices 101A-101D, as well as on the main scenarios of their actions.

Furthermore, the installation and configuration module 120 includes an analysis module 124 that is configured to access the device data in files 116 and perform an analysis of the collected user information and device information to automatically generate usage patterns 128. In one aspect of the disclosure, the analysis module 124 may use machine learning as an analysis method. In other aspects, the analysis module 124 may use any combination of machine learning, simple rules, a decision tree and/or heuristics in order to generate the usage patterns 128. In the exemplary aspect, usage patterns 128 are processed and structured information is generated about users and the devices 101A-101D that can be used for various purposes, such as automation, automatic configuration, simulation of possible situations, and the like. According to one aspect, usage patterns 128 can include user behavior such as how a user interacts with the device and software installed on the device and device behavior such as CPU load, hard disk usage, or the like. Generally, usage patterns 128 comprises any interaction or activity the user has with a device and any activity of the device itself. Usage patterns 128 generated by analysis module 124 can be stored anywhere (e.g., back in device information database 11) in structured format, for example, in the form of XML files.

Furthermore, the device configurations system 110 can include and execute an installation and configuration settings module 126. Thus, when a new computing system (e.g., computing systems 102A or 102B) requires new system settings and/or a software installation (or update), the installation and configuration settings module 126 is configured to access the usage patterns 128 generated by analysis module 124 and compare the usage patterns 128 with an analysis result of the new device. Based on this comparison, the installation and configuration settings module 126 is configured to generate installation instructions and configurations for the software application installation on the new computing device.

According to the exemplary aspect, the device configurations system 110 generates the usage patterns 128 based on the collection and analysis of large amounts of information from activity on the existing systems 101A to 101D, which allows the system 110 to create automated usage patterns 128 that include particulars of the user systems and specific aspects of conducts and habits of the user. For example, usage patterns created on basic obvious facts, in part facilitate the identification of patterns that can be obtained only in the analysis of large data sets.

Moreover, according to an exemplary aspect, the collected data by data collection module 122 can be divided/classified into two basic types of data. The first type is data that is independent of the user. For example, the characteristics of the equipment and installed programs (i.e., software and hardware environment), the bandwidth of the communication channel (Internet channel), the location of the devices, the throughput and the like. The second type of data relates to specific behavior and user preferences, such as user schedules, other specific user data and the like.

In one example, when software is installed on an existing computing device (e.g., device 101A, 101B, etc.) to backup data on this computing device, the data collection module 122 collects information about its location and speed of the Internet channel and stores this information in the device information database 114. On the basis of the received data, the analysis module 124 can automatically assign a location for data backup (for example, the computer has a slow communication channel, so sending backups to the cloud is not offered), as well as the time of the backup (for example, when the computer shuts down or at night time), depending on the settings of similar computers. The backup location, backup time, backup interval, backup execution time, backup scheme, backup retention policy, process priority, network priority and related information can be used to automatically generate usage patterns by the analysis module 124. Then, when the user adds another device (e.g., a new computing device 102A, such as a new tablet) to the system 100, the installation and configurations settings module 126 may use this information when the new computing device 102A requests (or is scheduled to receive) installation of the same or similar data backup software application. Thus, the specific configurations for storing the data by the new computing device 102A are generated automatically and set during software installation so that the user is not prompted and does not need to make any decisions regarding the configuration settings, and the like, of the new software application. In some aspects, the specific configurations are stored in the registry, a configuration file or a database. The configuration is predetermined, or set, through a mechanism that the software provider provides. For example, software providers may provide the ability to change the settings during installation, or later on via a configuration library or API. As a result, the system 100 provides an algorithm and method for installing a software application on a user device, while automatically optimizing the configurations and settings of the application based on past usage patterns.

In some aspects, the analysis module 124 generates the usage patterns based on certain configurations on each system, such as backup configurations. In this aspect, the backup configuration information may include backup location, backup time, backup interval, backup execution time, backup scheme, backup retention policy, process priority, network priority, though other information is also contemplated. In some aspects, the usage patterns may be generated according to the backup information (or other device information) by calculating, for example, the number of important file changes on a system, volume changes on drives, idle periods of the system, low CPU and memory usage periods, space availability, network bandwidth availability and the like. Those of ordinary skill in the art will recognize that other measures of each computing device coupled to the device configuration system 110 may be collected in order to aid the analysis module 124 in generating the usage patterns. In other aspects of the disclosure, the analysis module 124 may generate the usage patterns on other aspects of each system such as application configurations, hardware configurations, peripheral information and the like.

In this aspect, the backup interval may be affected by a few factors: 1) the size of a storage drive changes greater than a predetermined threshold (e.g., 200 MB), 2) a number of important files are changed (e.g. the number being greater than a threshold of, for example, 5 files), and 3) the size of important files change to greater than a particular threshold (e.g., 5 MB). In some aspects, the system/file changes are measured such that the thresholds are exceeded for a predetermined number of days, such as 10 days, for example. In some instances, a minimum number of backup intervals for a set amount of days is predetermined.

In some aspects, backup execution time is selected based on a plurality of factors such as the best idle time (e.g., a common idle time over a predetermined minimum number of days). Times in which a computer is not powered on will not be considered as a backup execution time. If no common idling time is found, a second best time is based on common low CPU and memory usage periods. If a backup time is missed, the analysis module selects the next best time based on the computer shut-down timings and common idling time.

In some aspects, the backup scheme is selected as single, incremental differential, or full backup. The backup scheme is a trade-off between storage space and recovery time. A full backup is generally selected by the analysis module when there is very high storage space availability. A differential backup is selected when there is high storage space availability, but not as much availability for a full backup. An incremental backup is selected by the analysis module when there is medium space availability, less than there is for a differential backup. Finally, the single version backup scheme is selected when there is low space availability, and not enough to perform any of the other backup schemes. In one example if the remaining storage space is five terabytes and a backup will occupy 1 gigabyte of space, at most four copies are retained in this aspect. If the new backup is too large in size, older copies are deleted. In one aspect, backup to cloud storage uses incremental or single version backup schemes. In one aspect, the backup size may change overtime, so the analysis module takes the growth rate of the backup size into account when selecting a backup scheme.

The analysis module 124 also selects the backup scheme based on one or more parameters, some of which have already been mentioned. In one aspect, the parameters comprise: "g"—expected growing size of the backup which may be an average, or based on a particular percentile (e.g., $70^{th}$ percentile), "$n_{min}$"—minimum number of retention copy for backup, "$D_p$"—percentage of storage to be used and "$D_s$"—amount of free storage. The parameters g, $n_{min}$, $D_p$ and $D_s$, are used in the following formulas to determine the following conditions:

$$(n_{min}/2)*(2*(5*\text{Full backup})+(n_{min}-1)*g) \leq D_p*D_s \quad \text{C1:}$$

$$(n_{min}/2)*(2*(\text{Full backup}+4*\text{differential})+(n\min-1)*g) \leq D_p*D_s \quad \text{C2:}$$

$$(n_{min}/2)*(2*(\text{Full backup}+4*\text{incremental})+(n\min-1)*g) \leq D_p*D_s \quad \text{C3:}$$

Figure 4:
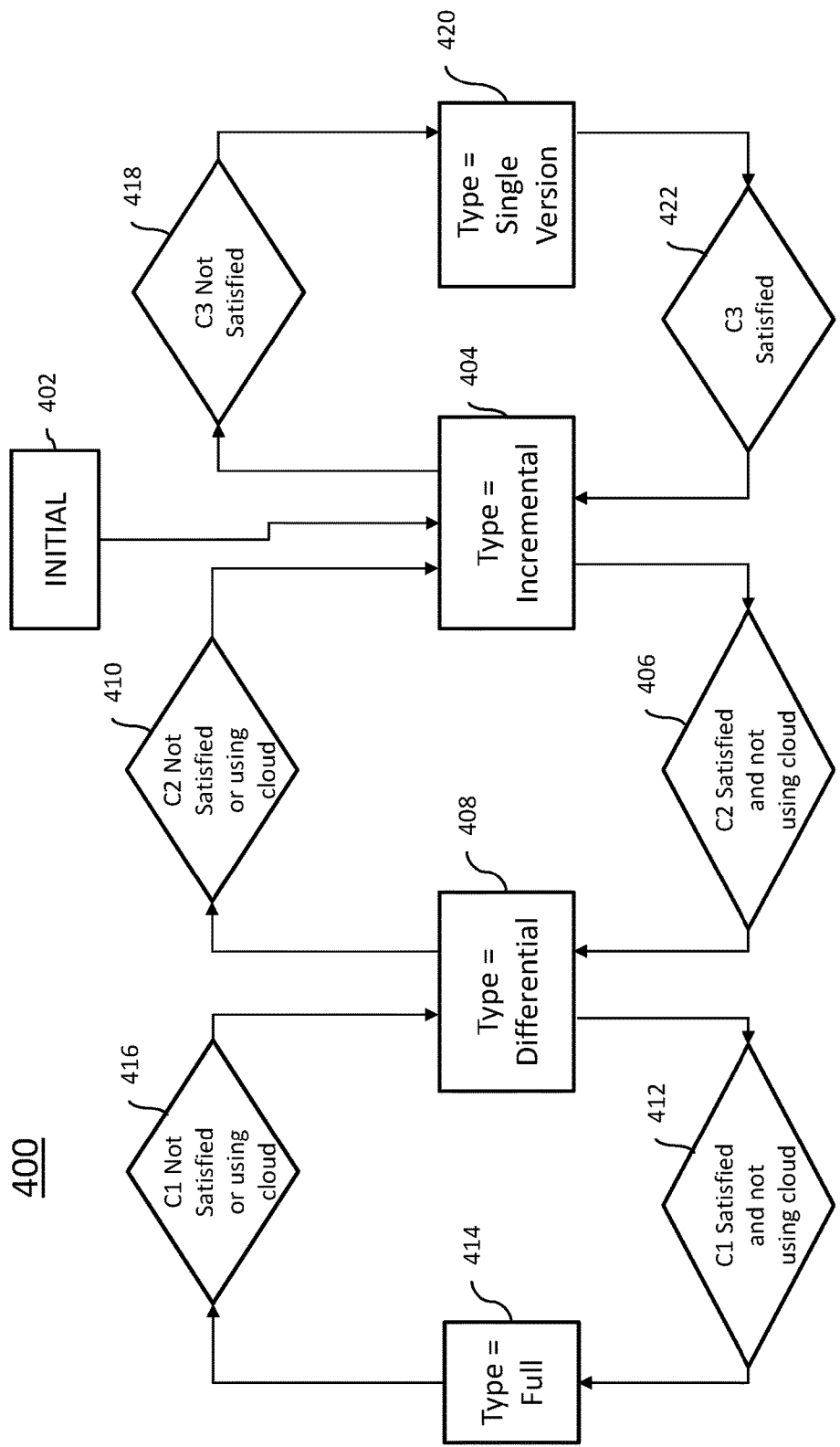
FIG. 4 is a flowchart for a method for determining the data backup scheme in accordance with exemplary aspects of the present disclosure.

The conditions are used in determining a backup scheme, detailed further in FIG. 4.

The analysis module 124 may also determine a backup retention policy which determines how copies of backups are retained. Generally, the full capacity of available hard-disk storage space is leveraged. If the condition C1 above is chosen, for example, then "$n_{max}$", estimated retention copies, is inferred according to the following formula:

$$n\max = \mathrm{argmax}(n)\left(\frac{n}{(2*(2*(5*\text{Full Backup})+r*(n-1)))}\right) \leq p*s$$

As a result, the retention policy is to keep $n_{max}$.

The analysis module 124 may also determine process priority as low, normal or high. The process priority is set adaptively according to current CPU load and Memory Load, whether a user is currently using a computer, and other factors. In one example, processor priority is set to low when CPU and Memory usage is high. In another example, processor priority is set to normal. When both CPU usage and Memory usage are normal. In yet another example, processor priority is set to high when a user is not using the computer for a predetermined period of time, e.g., when the CPU and memory usage are comparatively low.

Similarly, the analysis module 124 may determine network priority as being low, normal or high. If the network is busy, a low network priority is selected. If the network is normal, the network priority is set to normal. However, if the network usage is low, or a user is not using the network, the network priority is set to high. According to one aspect, the network priority can be set adaptively according to current network load and whether a user is using the computer.

Figure 3B:
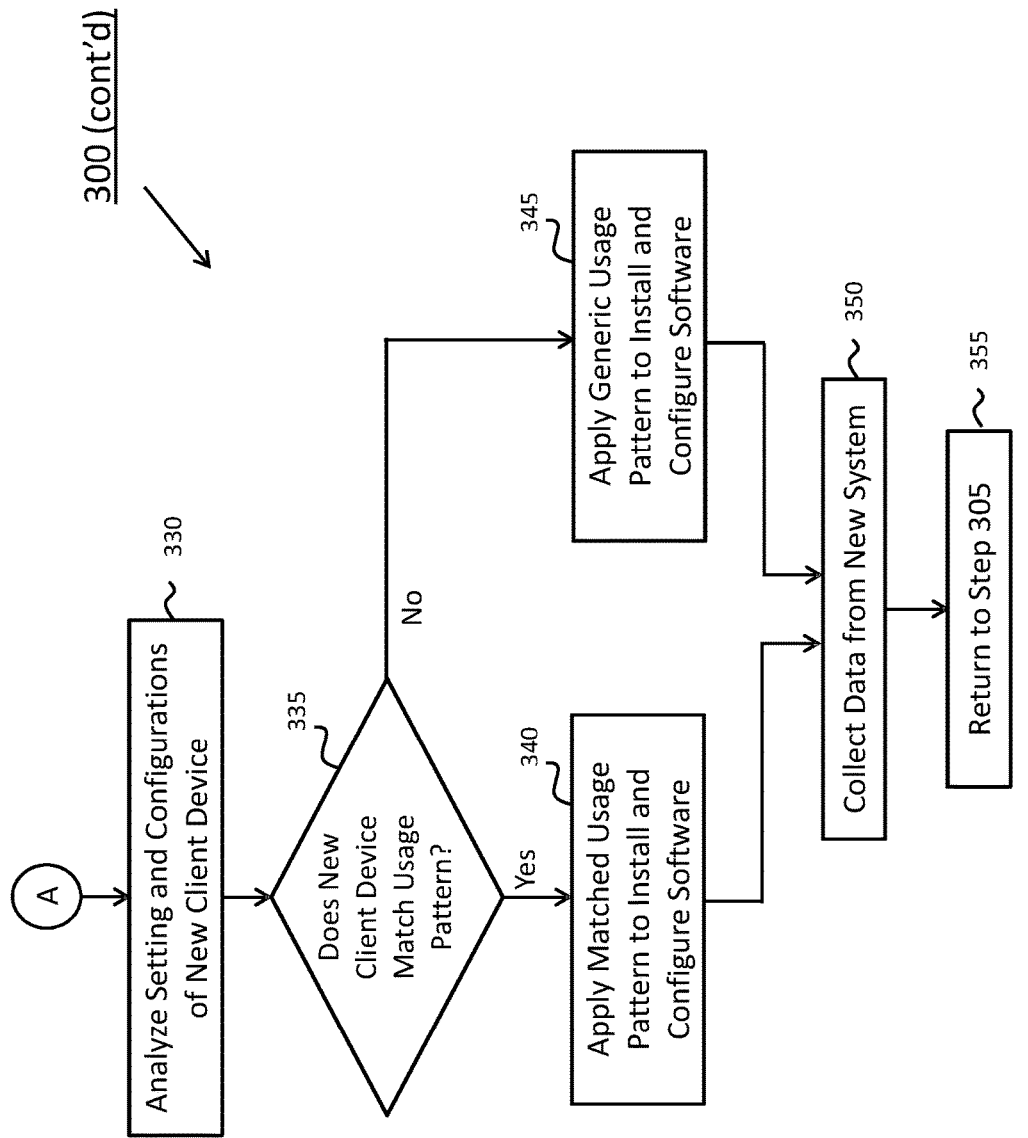

FIG. 3A and FIG. 3B illustrate a flowchart for a method for optimizing software installations, configurations and operational settings based on predetermined usage patterns according to an exemplary aspect. It should be appreciated that the exemplary method makes use of the system components as described above. Thus, the details of the components of system 100 will not be repeated herein.

As shown, initially at step 305, the data collection module 122 of device configuration system 110 is configured to collect data on the product installation and configuration of all currently available user computing devices 101A-101D, and information about user behavior, their typical actions and preferences. For example, according to one exemplary aspect, the data collection module is configured to collect information including: (1) device information (e.g., network bandwidth, operating systems, storage capacity, memory capacity, CPU processing power, operating systems architecture (32 or 64 bits, for example), processing bandwidth);

(2) user information (e.g. installed software, user location, user ethnicity, gender, user company, time zone and the like); and (3) user software or system configurations, e.g., startup working directories, plugins and modes for user software, and background images, font sizes, keyboard shortcuts and the like in system configurations.

It should be appreciated that step 305 can be performed at a single time, in sequence of each device, periodically, continuously or the like. Moreover, according to the exemplary aspect, the data collection module 122 is configured to poll each connected device 101A-101D to request the desired information. For example, the data collection module 122 can transmit a request to each device requesting specific configuration information about one or a category of software applications installed thereon and/or information about specific types of user behavior. In an alternative aspect, each existing computing device 101A-101D can include a local software module residing thereon that is configured to collect this information and transmit it to device configuration system 110 on a periodic or continuous basis.

The device and user information received by data collection module 122 is then stored as files 116 in device information database 114 where it can be classified based on different criteria at step 310. Next, the collected device and user data can be accessed by the analysis module 124, in which the further data processing can be performed at step 315. Based on the analysis of the collected device and user data, the analysis module 124 can automatically build one or more usage patterns 128 or a set of different patterns. For example, in an exemplary aspect, the analysis module 124 can develop a prediction model using the information collected by the data collection module 122 discussed above. In this aspect, the prediction model is trained by a specific of machine learning algorithm (e.g., random forest, SVM, neural network), where the training set is based on the collected information. In one aspect, if a new user is identified, the device information and user information of the new user will be provided as an input to the machine learning algorithm, which will predict the suitable software or system configurations for the user based on the prediction model. In one aspect, there are two stages to predict the configuration. In the first stage, basic configuration is created during the installation on the new device based on the usage patterns and characteristics that are immediately available such as CPU/RAM usage and amount, network throughput and the like. In the second stage, the configuration information is updated (i.e., tuned) according to a predetermined frequency based on new usage data collected and then the machine learning prediction model is retrained based on the new information to predict suitable configurations.

Next, at step 325, the device configuration system 110, and specifically, communication interface 118, is configured to detect if a new device (e.g., computing device 102A) has been added to the network and coupled within system 100, for example. This can be done using any existing technique. For example, if system 100 is being implemented for a corporate or home network, the new device is detected when it registers (e.g., accesses the network and enters a password) with the system 100 (e.g., connects with a system WiFi router). Alternatively, a system administrator and/or device owner may register/connect the device with the system 100.

In any event, when the new user device appears on the network (or when software is installed on a new PC, for example), the installation and configurations and settings module 126 is configured to perform analysis (step 330) of the new device's system, including the configuration, installed software, geographical location, communication channel, and the like, to obtain an analysis result. For example, the installation and configurations and settings module 126 may transmit a request to the new device prompting the device to provide specific information relating to the new systems hardware and software settings, functionality and the like. This information (i.e., the analysis result) can be used to build a profile of system and software settings for the new device that can be compared with the existing usage patterns. Although not shown in FIG. 3B, this collected information can also be stored in device information database 114 according to an exemplary aspect and added to the already collected information in the database.

Based on the collected information (including device and user information) from the new computing device 102A, the installation and configurations and settings module 126 is configured to compare this information (i.e., the analysis result) with the existing set of usage patterns 128 to determine if a match exists. In one aspect, a comparison may be performed between device information about new computing device 102A in the analysis result, with device information identified in the stored usage patterns 128. If the new computing device 102A has many characteristics that match characteristics of devices/installed software/location and the like of a particular usage pattern, that usage pattern will be selected as a match. Varying degrees of matching between the analysis result and usage patterns are contemplated in this aspect of the disclosure. In one aspect, each part of the analysis result is weighted to determine which criteria are most important, where the weights are predetermined or may be modified by the analysis module 124. It should be appreciated that while an identical match is ideal, the installation and configurations and settings module 126 may employ a predefined threshold as to what constitutes a match or the best usage pattern (or set of patterns) to be selected at step 335.

In one example, it is possible that no match or closest match can be identified at step 335. In this case, the installation and configurations and settings module 126 may be able to access a set of predefined usage patterns (e.g., generic patterns defined by an administrator) and apply the predefined generic usage patterns to install and configured the software on the new device at step 345. It should be appreciated that step 345 is optional according to the exemplary aspect.

Otherwise, at step 340, the installation and configurations and settings module 126 selects the best or closest match(es) from the plurality of usage patterns 128 and generates installation instructions and setting configurations for the system settings and/or software application to be installed/configured/modified on the new computing device 102A. The device configuration system 110 can then transmit the installation instructions either with the software application or separately to the new computing device 102A via the network using communication interface 118.

In an optional aspect, the user of the new computing device 102A is prompted on an interface to either confirm or deny the software application installation and automatic configurations and settings established by the installation and configurations and settings module 126. For example, the user can be presented with a visual display of the information relating to the identified match(es) of usage patterns 128 that will be used to configured the system settings and/or software application of the new computing device 102A. If the recommended settings based on the matching usage pattern is confirmed by the user of the new computing device 102A, the matching usage pattern is then used to configure the user's system settings, software installation, etc. For example, if there are any specific settings of the system settings, software application, etc., that need to be defined (e.g., location for data backup), the new computing device 102A is configured to analyze the received "best match(es)" usage patterns to determine whether this desired configuration parameter is defined therein. If so, the new computing device 102A then automatically sets this configuration accordingly so that it is not perceived by the user and the user is not required to perform any operation. In other words, installation and configuration settings module 126 is configured to transmit instructions to device 102A to automatically configure this device and/or install the software application(s) on this device. As a result, the configurations and parameters for the system settings/software can be optimized for the specific user in an automatic manner without requiring user interaction.

Finally, as shown, at step 350, additional device and user information can be collected on the new computing device 102A and transmitted to the data collection module 122 to be stored in device information database 114 and further analyzed by analysis module 124 as described above. As a result, the device configuration system is continuously building a profile of usage patterns 128 that can be used subsequently each time a new device is added to the system 100 (e.g., the corporate or home network).

FIG. 4 is a flowchart for a method 400 for determining the data backup scheme in accordance with exemplary aspects of the present disclosure.

The analysis module determines the backup scheme based on several parameters: "g"—expected growing size of the backup which may be an average, or based on a particular percentile (e.g., $70^{th}$ percentile), "$n_{min}$"—minimum number of retention copy for backup, "$D_p$"—percentage of storage to be used and "$D_s$"—amount of free storage. The parameter are used in the following formulas to determine the following conditions:

$$(n_{min}/2)*(2*(5*\text{Full backup})+(n_{min}-1)*g) \leq D_p*D_s \qquad C1:$$

$$(n_{min}/2)*(2*(\text{Full backup}+4*\text{differential})+(n_{min}-1)*g) \leq D_p*D_s \qquad C2:$$

$$(n_{min}/2)*(2*(\text{Full backup}+4*\text{incremental})+(n\text{min}-1)*g) \leq D_p*D_s \qquad C3:$$

The method 400 illustrates how each condition determines the backup scheme that is implemented.

The method begins at 402, where the initial backup method is set to "incremental" at 404. If the condition "C2" is satisfied and cloud backup is not being used, the analysis module 124 selects the backup type as differential at 408. If, at 410, C2 is no longer being satisfied or the cloud is being used, the backup type is reset to an incremental backup. However, if at 412, the condition C1 is satisfied and cloud backup is not being used, the backup scheme is set to full backup. At 416, if C1 is no longer satisfied or the cloud is being used, the backup type is reset to differential at 408.

Returning back to the original "Initial" state at 402, where at 404 the backup type is set to incremental, if the condition C3 is not satisfied, the method 400 proceeds to 420 where the analysis module 124 selects a single version backup scheme. However, if at some point C3 is satisfied at 422, the backup scheme is reset to incremental at 404.

Figure 5:
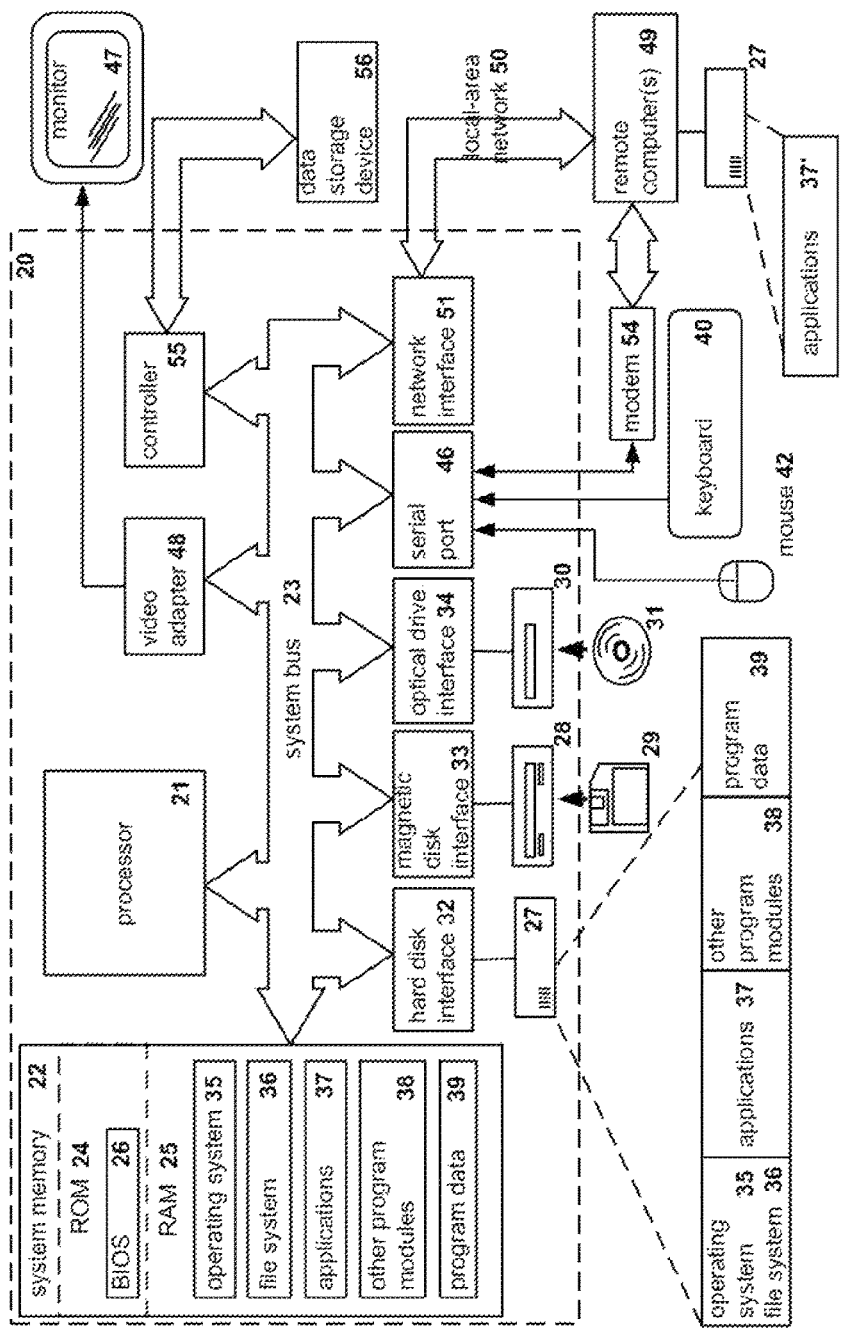
FIG. 5 illustrates a block diagram of an example of a general-purpose computer system on which the disclosed system and method can be implemented according to an example aspect.

FIG. 5 illustrates a block diagram of an example of a general-purpose computer system (which can be a server) on which the disclosed system and method can be implemented according to an example aspect. As shown, a general purpose computing device is provided in the form of a computer system 20 or the like including a processing unit 21, a system memory 22, and a system bus 23 that couples various system components including the system memory to the processing unit 21. It should be appreciated that computer system 20 can correspond to the device configuration system 110, processing unit 21 can correspond to CPU 112, and system memory 22 and/or file system 36 can correspond to device information database 114.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20. The logical connections include a network interface 51 and connected to a local area network (i.e., LAN) 51, for example, and/or a wide area network (not shown). Such networking environments are commonplace in offices, enterprise-wide computer networks, Intranets and the Internet. It should be appreciated that remote computers 49 can correspond to existing computing devices 101A-101D and/or new computing devices 102A and 102B as described above.

When used in a LAN networking environment, the computer 20 is connected to the local network 51 through a network interface or adapter 53. When used in a WAN networking environment, the computer 20 typically includes a modem 54 or other means for establishing communications over the wide area network, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the concepts disclosed herein.

What is claimed:

1. A method for automatic configuration of a computing device, the method comprising:

collecting, by a hardware processor, in an electronic database, device information of a plurality of computing devices and user information associated with operation of the plurality of computing devices;

analyzing, by the hardware processor, the device information and the user information to generate at least one usage pattern associated with the plurality of computing devices;

comparing, by the hardware processor, new device information and new user information of a new computing device with the at least one usage pattern associated with the plurality of computing devices to identify an optimal configuration for the new computing device;

generating installation instructions and configurations for system settings and software based on the optimal configuration; and configuring, by the hardware processor, system settings of the new computing device based on the generated installation instructions and configurations.

2. The method according to claim 1, further comprising:

generating, by the computer processor, a plurality of usage patterns associated with the plurality of computing devices based on the analyzing of the new device information and the new user information; and identifying, by the computer processor, the optimal configuration for the new computing device based on a closest match between one of the plurality of usage patterns and the new device and new user information of the new computing device.

3. The method according to claim 1, wherein the new device and the new user information of the new computing device includes software, geographical location, and communication channels used by the computing device and the device information of the plurality of computing devices comprises information relating to software and hardware environments, bandwidth of communication channels, and geographic location of the plurality of computing device.

4. The method according to claim 3, wherein the user information of the plurality of computing devices comprises and user preferences selected for the plurality of computing devices.

5. The method according to claim 1, further comprising adding the new device information and the new user information of the new computing device to the device information of the plurality of computing devices collected in the electronic database to build a profile for generating the at least one usage pattern.

6. The method according to claim 1, wherein the automatic configuring of the system settings of the new computing device comprises transmitting instructions to the new computing device to set the system settings accordingly.

7. The method according to claim 1, further comprising:

applying the optimal configuration to the new computing device after confirmation from a user of the new computing device.

8. The method of claim 1, wherein usage patterns are generated based on information from each of the plurality of computing devices related to one or more of backup location, backup time, backup interval, backup execution time, backup scheme, backup retention policy, process priority, and network priority.

9. A system for automatic configuration of a computing device, the system comprising:

an electronic database configured to store device information of a plurality of computing devices and user information associated with operation of the plurality of computing devices; and a hardware processor configured to:
    analyze the device information and the user information to generate at least one usage pattern associated with the plurality of computing devices,
    compare device information and user information of the computing device with the at least one usage pattern associated with the plurality of computing devices to identify an optimal configuration for the computing device,
    generate installation instructions and configurations for system settings and software based on the optimal configuration; and
    configure the system settings of the computing device based on the generated installation instructions and configurations.

10. The system according to claim 9, wherein the hardware processor is further configured to:
    generate a plurality of usage patterns associated with the plurality of computing devices based on the analyzing of the device information and the user information, and
    identify the optimal configuration for the computing device based on a closest match between one of the plurality of usage patterns and the device and user information of the computing device.

11. The system according to claim 9, wherein the device and user information of the computing device includes software, geographical location, and communication channels used by the computing device and the device information of the plurality of computing devices comprises information relating to software and hardware environments, bandwidth of communication channels, and geographic location of the plurality of computing device.

12. The system according to claim 11, wherein the user information of the plurality of computing devices comprises and user preferences selected for the plurality of computing devices.

13. The system according to claim 9, wherein the hardware processor is further configured to add the device and user information of the computing device to the device information of the plurality of computing devices collected in the electronic database to build a profile for generating the at least one usage pattern.

14. The system of claim 9, wherein the hardware processor is configured to automatically configure the system settings of the computing device by transmitting instructions to the computing device to set the system setting accordingly.

15. The system of claim 9, wherein usage patterns are generated based on information from each of the plurality of computing devices related to one or more of backup location, backup time, backup interval, backup execution time, backup scheme, backup retention policy, process priority, and network priority.

16. A non-transitory computer-readable medium storing instructions thereon that when executed by a hardware processor, perform a method comprising:
    collecting in an electronic database, device information of a plurality of computing devices and user information associated with operation of the plurality of computing devices;
    analyzing the device information and the user information to generate at least one usage pattern associated with the plurality of computing devices;
    comparing new device information and new user information of a new computing device with the at least one usage pattern associated with the plurality of computing devices to identify an optimal configuration for the new computing device; and
    generating installation instructions and configurations for system settings and software based on the optimal configuration;
    configuring system settings of the new computing device based on the generated installation instructions and configurations.

17. The medium according to claim 16, wherein the further comprises:
    generating, by the computer processor, a plurality of usage patterns associated with the plurality of computing devices based on the analyzing of the new device information and the new user information; and
    identifying the optimal configuration for the new computing device based on a closest match between one of the plurality of usage patterns and the new device and new user information of the new computing device.

18. The medium according to claim 16, wherein the new device and the new user information of the new computing device includes software, geographical location, and communication channels used by the computing device and the device information of the plurality of computing devices comprises information relating to software and hardware environments, bandwidth of communication channels, and geographic location of the plurality of computing device.

19. The medium according to claim 18, wherein the user information of the plurality of computing devices comprises and user preferences selected for the plurality of computing devices.

20. The medium according to claim 16, the method further comprising adding the new device information and the new user information of the new computing device to the device information of the plurality of computing devices collected in the electronic database to build a profile for generating the at least one usage pattern.

21. The medium according to claim 16, wherein the automatic configuring of the system settings of the new computing device comprises transmitting instructions to the new computing device to set the system settings accordingly.

22. The medium according to claim 16, further comprising:
    applying the optimal configuration to the new computing device after confirmation from a user of the new computing device.

23. The medium of claim 16, wherein usage patterns are generated based on information from each of the plurality of computing devices related to one or more of backup location, backup time, backup interval, backup execution time, backup scheme, backup retention policy, process priority, and network priority.

* * * * *